Nov. 27, 1923.                                                       1,475,382
                              E. GENNEVOIS
                         CHAIN FOR ELEVATING LIQUIDS
                           Filed Aug. 21, 1922    2 Sheets-Sheet 1
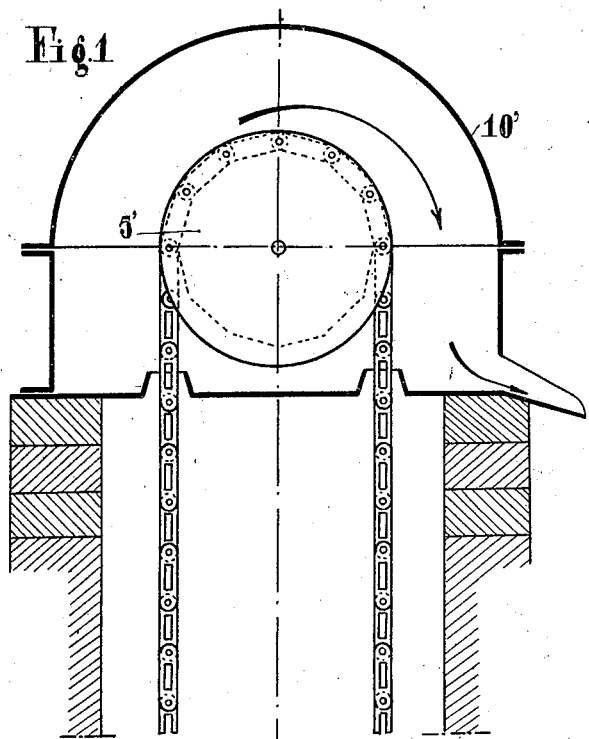
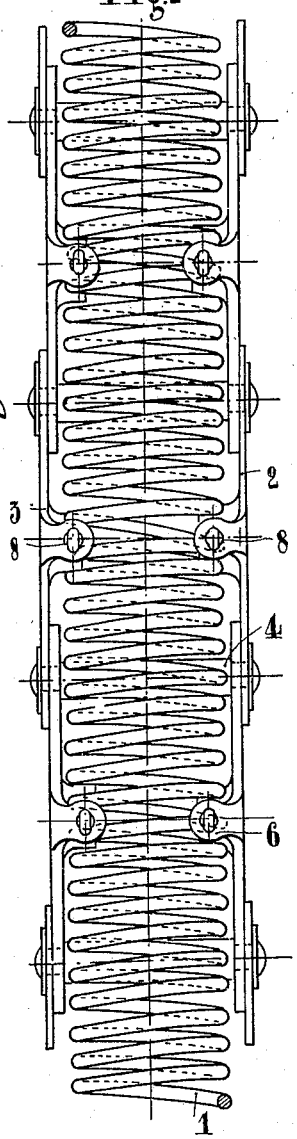
INVENTOR:
Emile Gennevois
BY
ATTORNEY Nov. 27, 1923.  1,475,382
E. GENNEVOIS
CHAIN FOR ELEVATING LIQUIDS
Filed Aug. 21, 1922  2 Sheets-Sheet 2
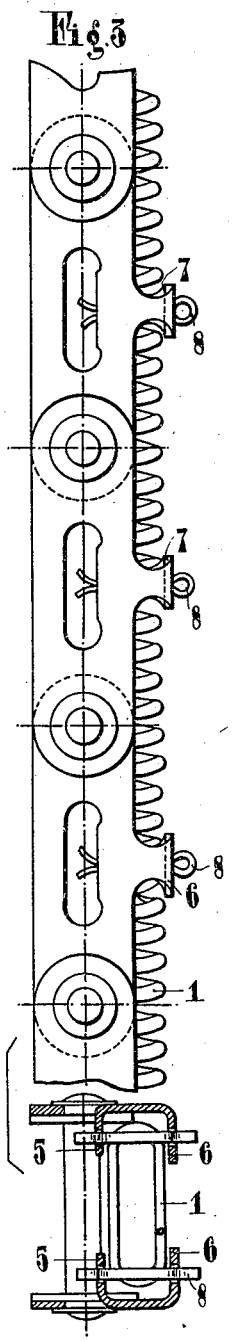
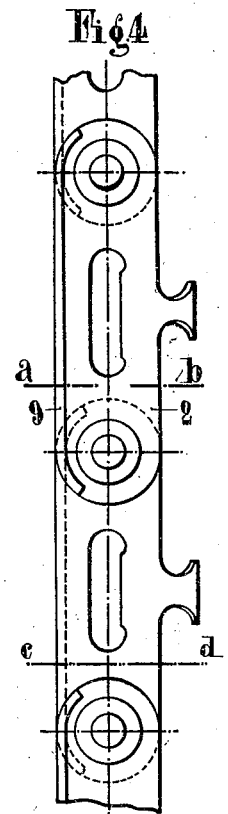
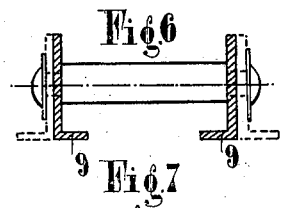
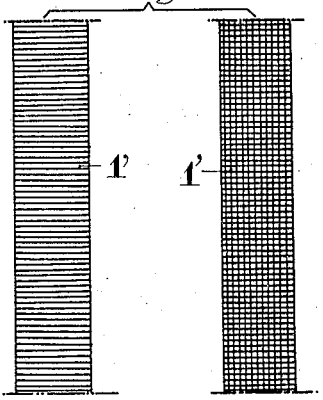
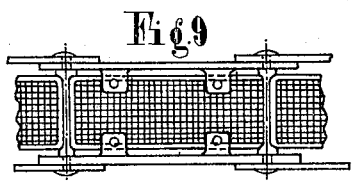
INVENTOR:
Emile Gennevois
BY
ATTORNEY Patented Nov. 27, 1923.

1,475,382

UNITED STATES PATENT OFFICE.

EMILE GENNEVOIS, OF CHATELLERAULT, FRANCE, ASSIGNOR TO LA SOCIETE ANONYME DES ELEVATEURS DE LIQUIDES "CHAINE-HELICE" BESSONUET-FAVRE, OF CHATELLERAULT, FRANCE.

CHAIN FOR ELEVATING LIQUIDS.

Application filed August 21, 1922. Serial No. 583,231.

*To all whom it may concern:*

Be it known that I, EMILE GENNEVOIS, a citizen of the Republic of France, residing at Chatellerault, France, have invented certain new and useful Improvements in Chains for Elevating Liquids, of which the following is a specification.

The present invention relates to an elevator chain, of the so-called Gennevois type, for conveying liquids, having certain improvements in respect of its shape and arrangements, which permit a novel and advantageous application of the principle of adhesion of liquids to bodies with which they are in contact.

In order to make the invention more clearly understood, there has been appended hereto a drawing showing, as an example, one embodiment thereof.

In the said drawings:

Figure 1 is a diagrammatic general view, showing the elevator chain set up in a well.

Figure 2 is a front elevation of a part of the elevator chain on an enlarged scale.

Figure 3 is a side elevation thereof.

Figure 4 illustrates a modification.

Figures 5 and 6 are transverse sections taken, respectively, on lines *a—b* and *c—d* of Figure 4.

Figures 7, 8 and 9 relate to a modified construction, in which the flat springs are replaced either by crossed or by straight wires or threads.

The chain which is the object of my invention, is characterized by:

A flexible elevator wire web composed of a plurality of flat springs 1 (Figure 2) interconnected by a bar or any other means. Said springs may be arranged in one row or in several rows superimposed on or entangled with one another.

The empty spaces inside the springs and the intervals between wires are determined by the superficial tensile stress limit of the liquid which keeps suspended from one wire to another in all directions.

The use of flat springs enables the elimination inside such springs of any extra body such as cables, chains, spongy material, etc., which are indispensable for the operation of liquid elevators constructed with cylindrical springs, the result being that all the empty parts of the flat springs are, as opposed to other systems, entirely filled with the liquid to be elevated and the volume of such liquid is, for a same section, practically twice the one obtained with cylindrical chains.

As shown by Figures 7, 8 and 9, the flat springs may be replaced by metal or other flat strips 1', made of straight or crossed wires or threads (Figure 7) and used when no great quantity of liquid has to be elevated; in each strip the liquid is held between the wires or threads, the spacing thereof having been calculated so as not to exceed the superficial tensile stress limit.

The liquid elevator web constituted by the springs or strips made of straight or crossed wires or threads, is secured to a vehicle or conveyor which, in the present case, is a blade sprocket chain of special shape (Figures 2, 3, 4, 5 and 6).

Blades 2 and 3, which compose the chain and are disposed at opposite sides thereof, are connected and interlinked by riveted cross pieces 4, each blade comprising inwardly rebated parts 5 taken from the material and small lugs 6 greatly flared at their base so as to lighten the chain. Lugs 6 and corresponding rebated parts 5 constitute a kind of sheath or case wherein spring 1 is housed. Said spring is immobilized by means of pins 8 engaged at its opposite ends in the parts 5 and 6 and, due to this arrangement, springs 1 can readily be replaced when worn or repaired if accidentally injured. The pins have also the effect of maintaining the spring wires so spaced that the superficial tensile stress limit of the liquid film may not be reached.

Figures 4, 5 and 6, illustrate a modification designed to obtain greater steadiness and more complete adhesion of the chain on the driving pulley.

For this purpose, the blades are formed along one edge with lateral flanges 9, the direction in which the flanges project being reversed from one blade to the next so as not to hinder rotation and to permit easy bending of the chain.

The metal or other flat plates in one row or in several superimposed rows are equally interspersed in the chain sheath or case with blades reduced to simpler proportions (Figures 8 and 9) and held therein by pins or any other securing means.

The elevator webs, whether made of flat springs or of flat strips, mounted on sprocket chains, are located on round or polygonal pulleys 5' (Figure 1) forming part of a mechanical device designed to support them and to drive them above the liquid to be elevated.

When setting the chain on the pulley of the mechanical device its links are made to pass under a counterweight pulley 7', which goes down into the liquid with the chain, thus stretching the latter and limiting its oscillations. This pulley may or may not be equipped with a stabilizer 9' connected to it by a suspension member 8' and designed to prevent it from dropping, to keep it vertically and to stretch the chain.

It will be noted that the arrangement of the spring or strip elevator webs on the blade sprocket chain offers the advantage of avoiding contact of the web wires or threads with the driving pulley of the device and with the stretcher pulley. Thus the very great advantage is secured of avoiding for such wires or threads the friction wear which occurs with the cylindrical spring systems that roll directly on the pulleys and have to bear, besides the weight of the water, the weight of the inner chain, cables, etc.

Working is as follows:

On any motive power rotating the upper pulley of the mechanical device the elevator chain is driven, due either to the polygonal shape of said pulley, the frictional engagement with said pulley of the curved blades comprising the chain and to their lateral flanges 9, if provided. As the chain moves through the liquid, the latter adheres to all the parts of the wire or thread web which becomes entirely filled, as well as the spaces between the blades. The liquid is then carried up in a direction tangential to the pulley and then thrown by centrifugal force into a casing 10' that encloses the upper part of the chain (Figure 1).

On the pulley of the mechanical device may be placed a single chain of a width determined according to the desired delivery which is substantially proportional, up to a certain limit, to the chain section; or several chains may be put side by side on one and the same pulley and deliveries increased considerably thereby, each chain working as if alone.

Having now particularly described and ascertained the nature of the invention as well as the manner in which the same is to be performed what I claim is—

1. An endless conveyor for elevating liquids, comprising a continuous, relatively-flat metal web, a continuous sheath encasing said web along its edges, and supporting connections between the two; substantially as described.

2. An endless conveyor for elevating liquids, comprising a continuous, relatively-flat web constructed entirely of wire, a continuous sheath encasing said web along its edges, and supporting connections between the two; substantially as described.

3. An endless conveyor for elevating liquids, comprising a continuous, relatively-flat metal web, a continuous sheath embodying two sets of interlinked blades disposed at opposite sides of the web and having inwardly-projecting members between which the edges of the web are received, connections between adjacent projecting members, and connections between the two sets of blades; substantially as described.

4. An endless conveyor for elevating liquids, comprising a web embodying a continuous flattened spiral, a continuous sheath encasing the web along its edges, and connections between the sheath and the web for preventing the superficial tensile stress limit of the liquid film spreading from spire to spire from being exceeded; substantially as described.

In testimony whereof I affix my signature in presence of two witnesses.

EMILE GENNEVOIS.

Witnesses:
 JULES TOUSSET,
 LUNEAU GEORGES.